April 21, 1931. M. M. GOLDBERG 1,801,499
AUDITING MACHINE
Original Filed July 20, 1921 5 Sheets-Sheet 1

FIG. 1

Inventor
Maximilian M. Goldberg
By
Carl Beust
Henry E. Stauffer
His Attorneys April 21, 1931.  M. M. GOLDBERG  1,801,499
AUDITING MACHINE
Original Filed July 20, 1921    5 Sheets-Sheet 2

Inventor
Maximilian M. Goldberg
By Pearl Benst
Henry E. Stauffer
His Attorneys

April 21, 1931.  M. M. GOLDBERG  1,801,499
AUDITING MACHINE
Original Filed July 20, 1921  5 Sheets-Sheet 3

Inventor
Maximilian M. Goldberg
By
His Attorneys

April 21, 1931.   M. M. GOLDBERG   1,801,499
AUDITING MACHINE
Original Filed July 20, 1921   5 Sheets-Sheet 4

Inventor
Maximilian M. Goldberg
His Attorneys

Patented Apr. 21, 1931

1,801,499

UNITED STATES PATENT OFFICE

MAXIMILIAN M. GOLDBERG, OF DAYTON, OHIO, ASSIGNOR TO NATIONAL CASH REGISTER COMPANY, OF DAYTON, OHIO, A CORPORATION OF MARYLAND

AUDITING MACHINE

Original application filed July 20, 1921, Serial No. 486,007. Divided and this application filed July 26, 1926. Serial No. 124,989.

This is a division of the application for Letters Patent of the United States of Maximilian M. Goldberg, Serial No. 486,007 filed July 20, 1921.

The parent case above mentioned relates to auditing machines. The present division relates to transfer mechanism for totalizers.

The primary object is to produce an improved form of transfer mechanism.

This invention is not to be regarded as restricted to use on totalizers of auditing machines only, but may be adapted to totalizers in various other types of machines such as cash registers and adding machines.

With this and other incidental objects in view, the invention consists in certain novel features of construction and combinations of parts, the essential elements of which are set forth in appended claims and a preferred form or embodiment of which is hereinafter described with reference to the drawings which accompany and form part of the specification.

Of said drawings:—

In general

The transfer mechanism is shown in connection with an auditing machine having 100 totalizers arranged in ten groups of ten totalizers in each group. The groups are divided into two tiers with the actuating racks between the tiers.

The racks are driven by a differential mechanism which is in turn stopped in various positions by electromagnets controlled by perforated strips. All of this mechanism is fully described in the parent case Serial No. 486,007.

In describing this invention the parts will be given exactly the same reference numerals as are given to the same parts in the parent case.

Framework

A base 130 (Fig. 1) supports the entire machine. Rising from the base are frames, not shown in this divisional case, which support the differential mechanism for driving the totalizer actuators and the totalizer shafts. A horizontal frame 134 (Fig. 1) is supported by these frames. This frame 134 supports the upper and lower totalizer actuating mechanisms. A top frame 136 (Fig. 1) is secured to the upright frames and supports some of the totalizer mechanisms.

Driving mechanism

Figure 13:
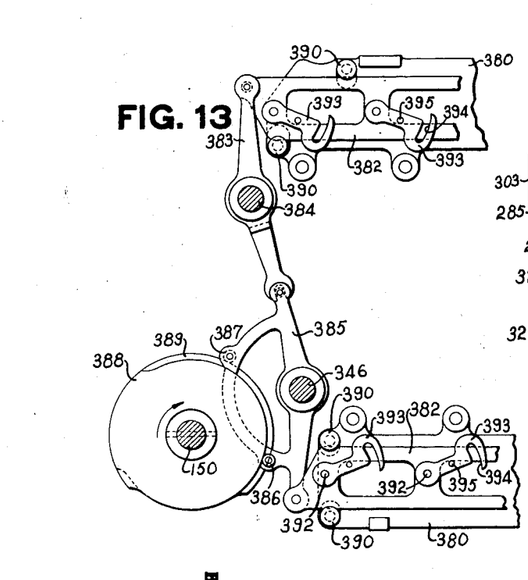
Fig. 13 is a fragmentary detail view of the transfer operating mechanism.

A main drive shaft 150 (Figs. 1 and 13) runs lengthwise through the machine and transmits motion directly to many parts of the machine. A supplementary drive shaft 151 receives its motion from the shaft 150 by means of gears (not shown) fast to the shafts 150, 151 respectively.

Power is supplied to the shaft 150 by a motor (not shown) of any suitable construction.

Totalizers

To facilitate selection, the accounting devices are divided into groups of any convenient number; and since the machine has 100 totalizers, the grouping here adopted has been by tens, so that there are ten groups of totalizers of ten totalizers to the group. While the accounting devices may be of any preferred form, it is desired to have them as compact as possible.

The accounting devices or totalizers here used belong to that class in which all of the denominational elements of the totalizers belonging to any group are mounted together, the units together, the tens together, and so on to the end of the series. It is, then, necessary to provide only one actuator for each set of the several denominational elements; namely; one actuator for all of the units, another for all of the tens, etc. With this arrangement, by effecting a relative movement between the totalizers and the actuators, all denominational elements of any desired totalizer may be brought into operative relation with the actuators.

The various sets of totalizer pinions are designated by the character 175 (Figs. 1 to 3 and 6 to 12). The first elements of all of the sets of any group are to be taken as constituting one totalizer, the first one in the first set being the units of that totalizer, the first one in the second set being the tens of that totalizer, the first one in the third set being the hundreds of that set, and so on to the end of the series. The second totalizer is made up of the second element of the first set which is the units of that totalizer; the second element of the second set which is the tens, the second element of the third set which is the hundreds, and so on to the end. The third totalizer has the third element of the first set for its units, the third element of the second set as its tens, the third element of the third set as its hundreds, etc. The tenth totalizer has the last element of the first set as its units, the last element of the second set as its tens, the last element of the third set as its hundreds, etc. Each totalizer is made up of ten elements, which may, therefore, indicate a maximum of 9,999,999,999. The size of the totalizers namely, the number of denominations included, will vary with the requirements to which the machine is to be put, and for many purposes a much smaller number of denominations than here disclosed will suffice.

Each group of ten totalizers is mounted upon a shaft 176. There are ten of these shafts, arranged in two tiers of five shafts each slidably mounted.

Differential setting mechanism

The shafts 176 which carry the respective groups of totalizers are so positioned with respect to the racks that the denominational elements of any of the totalizers may be brought into operative relation therewith. For this purpose a differential mechanism is used, which is fully described in the parent case and therefore, will not be described nor shown herein.

Totalizer actuating mechanism

Figure 1:
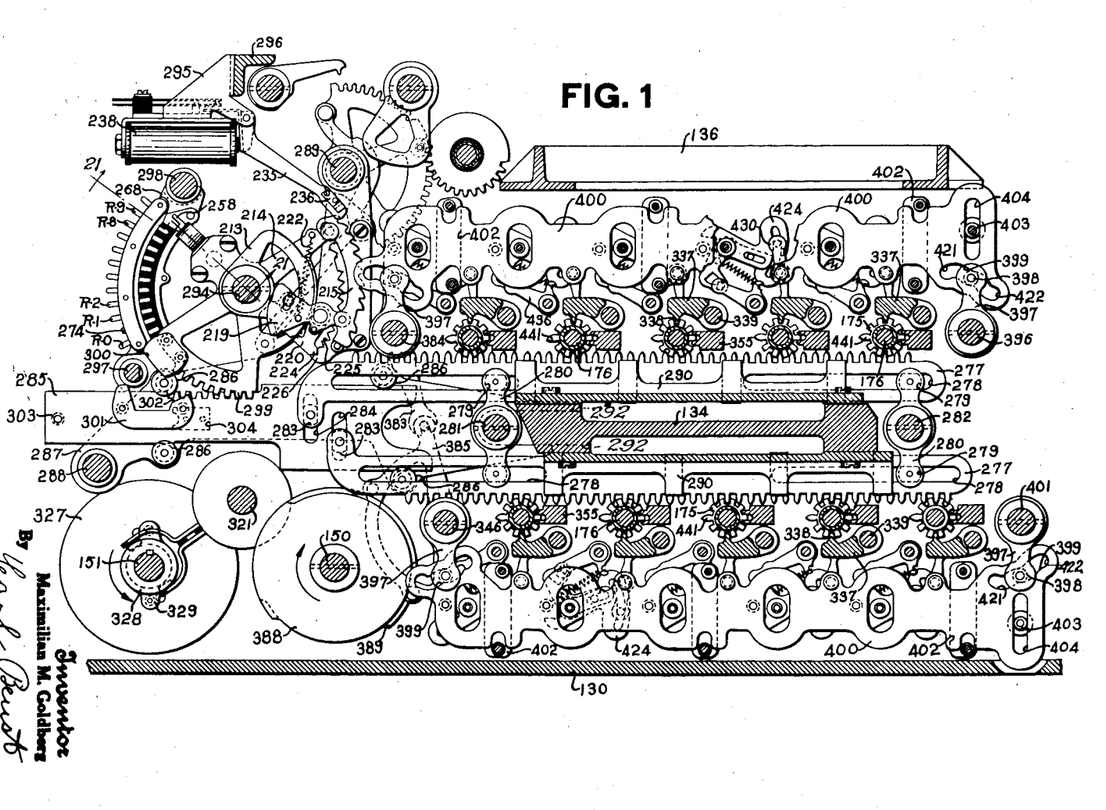
Fig. 1 is a sectional view through the auditing machine, and shows the tens order differential bank and the general position of the transfer mechanism.

The totalizers are operated by actuating racks 277 (Fig. 1). As there are ten denominations to each totalizer, and as there are two tiers of totalizers, the machine is provided with twenty racks 277, ten for the upper tier and ten for the lower tier of totalizers. Thus, it can be seen that the racks are arranged in pairs. As the pairs of racks for all denominations are identical the description and operation of one pair will suffice for all. Each rack 277 (Figs. 1 and 14) has two slots 278 into which project flattened pins 279 pivoted in levers 280 fast on shafts 281 and 282 supported by the machine frames. Each rack 277 carries a flattened pin 283 which projects into a slot 284 in a rack bar 285 slidably mounted between four rollers 286 carried by a plate or hanger 287 mounted on rods 288 and 289. This hanger 287 is also forked and has bearing in slots 292 (best shown in Fig. 14) in the frame 134. The rods 288 and 289 are supported by the machine frames. The racks 277 are shown in the engaging position, this being the position of said racks at the beginning of each cycle of movement. The racks 277 are held from lateral movement by channel bars 290, secured to the upper and lower sides of the frame 134.

Rack adjusting devices

The actuating racks 277 come to rest in the adjusted positions, at the end of each cycle of operation, and therefore, before the racks 277 can be adjusted to their new positions they must first be restored to their zero positions. This restoring movement takes place at the beginning of each cycle of operation. The racks 277 are in mesh with the totalizer pinions 175 during the restoring movement, and, when the racks 277 are being restored the amounts previously set up thereon are added into the totalizer pinions 175. Before the racks 277 are differentially positioned, to their new positions according to the amounts to be later added, said racks are disengaged from the totalizer pinions, and are again moved into mesh at the end of the cycle of operation.

The means for differentially positioning the rack bar 285 and consequently the actuating racks 277 will now be described. Fast on a shaft 294 (Figs. 1 and 20) are ten drivers 213, one for each pair of denominational racks. These drivers drive differential segments 214 by means of a latch device consisting of a lever 219 and a latch 220. Carried by the differential segment 214 (Fig. 1) and the latch device is a segmental rack 215 which has one tooth removed, the reason for which will be hereinafter explained. A spring 222 stretched between the segment 214 and the lever 219, holds the latch device in its proper position. By means to be hereinafter described the shaft 294 and drivers 213 are rocked first counter-clockwise and then clockwise. Upon counter-clockwise movement of the drivers a notch 229 (Fig. 20), therein engages a pin 230 on the differential segment 214 and moves said segment 214 counter-clockwise to zero position. During the clockwise movement of the driver 213 and differential segment 214 a magnet 238 (Fig. 1), associated with this differential may be energized at any of the ten positions, 0 to 9 of said differential segment 214. When so energized the magnet 238 draws its armature into contact therewith and rocks the arm 235 of said armature so that an angle stopping block 236 on said arm engages the proper one of the teeth of the rack 215, which stops said rack and causes the latch 220 to be disengaged from the driver 213, whereupon a projection 224 of the latch engages a notch 225 in a retaining bar 226 carried by the hanger 287. Each of these magnets 238 is carried by a bracket 295 and all of the brackets are secured to an angle bracket 296 supported by the machine frames.

Each of these differential segments 214 also carries movable contacts 257 and 258 (Fig. 21) which co-operate with both sides of a contact segment 268. These movable contacts are secured to the differential member 214 by a clamp 256, and are properly spaced by insulating plates 261, 262 and 263. There are ten of these contact segments, one for each denominational element of the totalizer. These segments are mounted on rods 297 and 298 (Fig. 1), supported by the machine frames. As the construction of these contact segments is fully described in the parent case Serial No. 486,007 it is thought that they need not be described in detail here as reference to said case may be had for a detailed description thereof.

Each contact segment 268 (Figs. 1 and 21) has on either side thereof an insulating plate 269 and a line contact 270, on one side, and 271 on the other side. There are also ten fixed contacts L—0 to L—9 on one side, and ten fixed contacts R—0 to R—9 on the other side. Plates 272 and insulating plates 273 hold the fixed contacts in place. There are also two plates 274, one on each side of the segment 268. Only one of these plates is shown in Fig. 1. The plate 274 (not shown) on the opposite side of the segment is located between the fixed contacts L—0 and L—1. The purpose of these two plates 274 will be explained later.

Figures 14, 15:
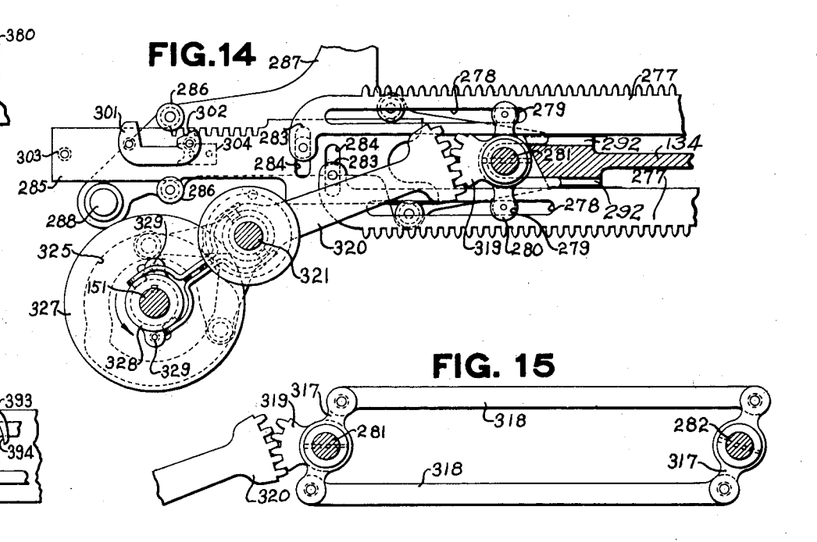
Figs. 14 and 15 are detail views of the totalizer actuating rack engaging mechanism.

The differential segment 214 has integral therewith a segment 299 (Fig. 1) which meshes with teeth on the rack bar 285. This segment 299 has secured to the side thereof a large tooth 300 which co-operates with a plate in the form of a rack 301 secured to the side of the rack bar 285. One side of this rack 301 is cut away to form a surface 302 (Figs. 1 and 14). As the differential segment 214 is rocked counter-clockwise the segment 299 moves the rack bar 285 to the right until a pin 303 thereon strikes a stop plate 304 which is secured to the plate 287. During the movement of the rack bar 285 the tooth 300 becomes fully engaged with the rack 301. When the stud 303 strikes the stop plate 304 it stops the movement of the rack bar 285. Just as the pin 303 strikes the plate 304, the outer edge of the large tooth 300 starts to ride upon the surface 302 of the rack 301. At this time the last small tooth on the left-hand side (Fig. 1) is still slightly engaged with the left-hand tooth space of the rack 285. As the segment 299 continues in its counter-clockwise movement the outer edge of the tooth 300 continues to ride upon the surface 302 of the rack 301 and the small teeth on the segment 299 become entirely disengaged from the small teeth of the rack bar 285. However, the engagement of the tooth 300 with the surface 302 prevents movement of the rack bar 285 toward the left, and since at this time the stud 303 is in engagement with the stop plate 304, the rack bar cannot move to the right. In this manner the rack bar is held against movement in either direction.

By means fully described in the parent case, Serial 486,007, electrical currents may pass through any one of the fixed contacts R—0 to R—9 (Fig. 1) and the fixed contacts L—0 to L—9 on the opposite side of the contact segment 268.

When this occurs the magnet 238 is energized and causes the latch to be disengaged from the segment 214 and the differential segment 214 is stopped as it is being rocked clockwise by the driver 213. During the clockwise movement of the differential segment 214 and segment 299 the tooth 300 slides off the surface 302 and properly meshes with the rack 301 and moves the rack 285 to the left until the small teeth of segment 299 and rack 285 again mesh.

Let it now be assumed that the segment 299 has been rocked counter-clockwise to its extreme position and moved the rack 285 to its extreme position, as above described, whereupon the tooth 300 has become disengaged from the rack 301 and lies against the surface 302. Let it now be assumed as the segment 299 starts on its clockwise movement that an electrical contact is made in the 0 position through the fixed contacts R—0 and L—0, the one opposite, and movable contacts 257 and 258. This of course, causes the magnet 238 to be energized, and the latch thereby disengaged at the 0 position. As it takes a little time for the latch to disengage the movable contact 258 after having made the contact at the 0 position will move slightly past, or in other words, will stop approximately on the short plates 274. When the latch disengages at the zero position, the tooth 300 does not leave the surface 302 and consequently the rack bar 285 is not moved. Let it now be assumed that an electrical contact is made in the "1" position. As above mentioned, the distance between the 0 and the 1 fixed contacts is twice the distance between the 1 and 2, and 2 and 3, etc. The reason for this, is that should the contact be made in the position now occupied by the plates 274 the tooth 300 would be stopped in a position still in engagement with the rack 301, and it would be entirely disengaged from the surface 302. Should the latch disengage in this position and the rack bar 285 be permitted to stop in such position there would be too much idle play for the rack bar 285, because the small teeth of the segment 299 and the rack bar 285 would not yet be in their proper meshing positions. Therefore, the 0 and 1 fixed contacts are spaced apart to give more travel to the segment 299 so that the small teeth thereon will be in full mesh with the small teeth of the bar 285 before the differential reaches the "1" position during the first part of its clockwise movement. Now, if the contact is made at the 1 position the movable contacts 257 and 258 will not actually stop until they reach the 2 position. By this time the latch is disengaged in the 1 position and the segment 299 is fully in mesh with the rack bar 285 and there is no danger of too much "play".

It will be noticed that there is a bar 274, located between the R—0 and R—1 contacts. This bar 274 has no function and could be left out of the bank, and a blank space left at this point, but for manufacturing reasons it is better to have it here as a similar bank of contacts is used in this machine for other functions, as shown in the parent application, Serial No. 486,007, in which a contact at this point is necessary, and it is preferred to manufacture all of the contact banks alike.

It is during the movement of the rack bar 285 toward the right (Fig. 1) that the racks 277 are in engagement with the totalizer pinions 175 and thereby cause the amount to be entered upon these pinions according to the position in which the latch 220 is disengaged from the driver 213. As shown in Fig. 1, the rack bar 285, is in its extreme left hand position and the differential segment 214 is in its extreme clockwise position. This is the home position assumed at the end of the analysis of a record.

The mechanism for oscillating the shaft 294 first counter-clockwise and then clockwise in order to drive the rack differential mechanism will now be described.

Fast on the shaft 294 is a segment 306 (Fig. 19) meshing with a driving segment 307 loose on the rod 288. The driving segment 307 has integral therewith two arms carrying rollers 308 and 309 cooperating with cams 310 and 311, respectively. These cams are loose on the shaft 151 and are driven by a clutch mechanism, not shown herein. This clutch is keyed to the shaft 151 and is used in order that the timing of the rack movement may be changed when necessary. This is fully described in the parent case.

*Rack engaging and disengaging devices*

The mechanism for engaging the racks 277 with, and disengaging the racks 277 from the totalizer pinions 175 will now be described.

Figure 16:
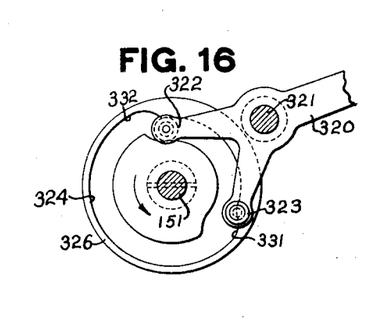
Figs. 16 and 17 are detail views of the pair of cams for engaging and disengaging the totalizer actuating racks with and from the totalizers.
Figure 17:
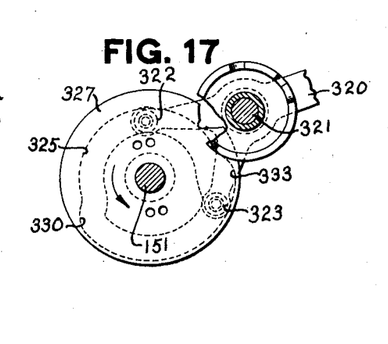

Fast on the shafts 281 and 282 (Fig. 15) are levers 317 connected by links 318. Fast on the shaft 281 is a segment 319 (Figs. 14 and 15) meshing with an operating segment 320 loose on a shaft 321 supported by the machine frames. Integral with the operating segment 320 are two arms carrying rollers 322 and 323 (Fig. 16) which engage cam races 324 and 325, respectively, cut in disks 326 and 327, respectively. The disk 326 is fast on the shaft 151 and the disk 327 is loose on the shaft 151. Adjacent this disk 327 and secured to the drive shaft 151 by means of a key is a clutch 328 having pins 329 which engage the disk 327. Counter-clockwise rotation of the disks 326 and 327 (Figs. 16 and 17) rocks the operating segment 320 first clockwise and then counter-clockwise. This movement rocks the segment 319 and shaft 281 first counter-clockwise and then clockwise. This movement of the shaft 281 is imparted to the shaft 282 by the levers 317 and links 318 (Fig. 15). As the shafts 281 and 282 are rocked counter-clockwise (Fig. 1) the levers 280 are rocked likewise, they being fast to the shafts 281 and 282, whereupon the racks 277 are moved in a vertical plane toward each other and disengaged from the totalizer pinions 175. The clockwise movement of the segment 319 reverses the movement of the shafts 281 and 282 and moves the racks 277 in a vertical plane away from each other into engagement with the totalizer pinions 175.

Considering now the action of the cam races 324 and 325 upon the rollers 322 and 323, respectively; upon the counter-clockwise movement of these two disks a rise 330 (Fig. 17) of the cam race 325 acts upon the roller 323 to rock the operating segment 320 clockwise. When this rise 330 acts on the roller 323, the roller 322 plays in a widened section 331 of the cam race 324. As the cams continue in their movement a rise 332 of the race 324 acts upon the roller 322 to rock the operating segment 320 counter-clockwise to normal position. When this occurs, the roller 323 is in a widened section 333 of the cam race 325. In other words, the cam race 325 causes the disengagement of the racks 277 from the totalizer pinions and the cam race 324 causes the engagement of the racks 277 with the totalizer pinions. This timing is such, that at the beginning of the cycle of operation the racks are in engagement with the totalizer pinions, as shown in Fig. 1, and after the racks have been moved to the right to cause the amount set up thereon during the previous cycle of operation, to be put upon the totalizer pinions, said racks 277 are disengaged from the pinions and remain disengaged until after the differential mechanism has been set for the succeeding operation of the machine. After this differential setting the racks are again engaged with the totalizer pinions so that at the beginning of said succeeding cycle of operation the amount as determined by the setting of the differential mechanism will be accumulated upon the totalizers.

The timing of the engaging and disengaging of the racks just described is for adding or analyzing operations. During totalizing or record producing operations the timing of the disengaging of the racks from the totalizer pinions is changed by slightly rotating the cam 327 in clockwise direction. However, the means for rotating the cam 327 has not been shown and will not be described since such description is not necessary for a complete understanding of the present invention.

*Totalizer aligning devices*

The means for aligning the totalizer pinions 175 will now be briefly described.

There are two aligners; a vertical aligner and a horizontal aligner for each shaft of totalizers. Associated with each shaft of totalizers are two cast arms 337 (Fig. 1) each having an aligner 338 normally engaging the totalizer pinions 175. These arms 337 are fast on a shaft 339 supported in the machine frames and serve to align the totalizers no matter what position the shaft 176 may be in. The aligners 338 are held in engagement with all pinions except those constituting the particular totalizer which is being actuated by the racks 277, until just before the shaft 176 is differentially positioned, at which time the aligners 338 are disengaged. Then after the shaft has been differentially set to select a desired totalizer for actuation, the aligners 338 are again engaged with the pinions 175.

A horizontal aligning bar 355 (Fig. 1) normally engages all of the totalizer pinions 175 on the shaft. This bar is shifted with the shaft when selecting totalizers, and is also movable toward and away from the shaft 176. These bars 355 must be disengaged from the totalizer pinions while they are being actuated, therefore immediately upon the beginning of the cycle of operation, said bars are moved to the right and disengaged from the totalizers 175. During this time the vertical aligner 338 is in engagement with the totalizer pinions except those which are being actuated. Just before the vertical aligner 338 is disengaged the horizontal bar 355 is again moved to the left (Fig. 1) to the position here shown to align all of the totalizer pinions.

*Transfer mechanism*

The transfer or carrying mechanism will now be described. Inasmuch as the totalizers are arranged with all of the units of each group together, all of the tens together, all of the hundreds together, etc., whenever any totalizer of the group is selected, all denominational elements of the selected totalizer must be in position to be engaged by the several racks. The units element of the selected totalizer must engage the units rack; the tens element the tens rack; the hundreds element, the hundreds rack; and so on to the end of the series. This requires that the carrying or transfer mechanism shall transfer from the element which is in engagement with the units to the element which is in engagement with the tens rack, and that the latter shall be able to transfer to the element that is in engagement with the hundreds rack, and so on through the series.

The transfer mechanism for the upper tier of totalizers is located, as viewed in Fig. 1 above the totalizer shafts and the transfer mechanism for the lower tier of totalizers is located below the totalizer shafts.

Figure 2:
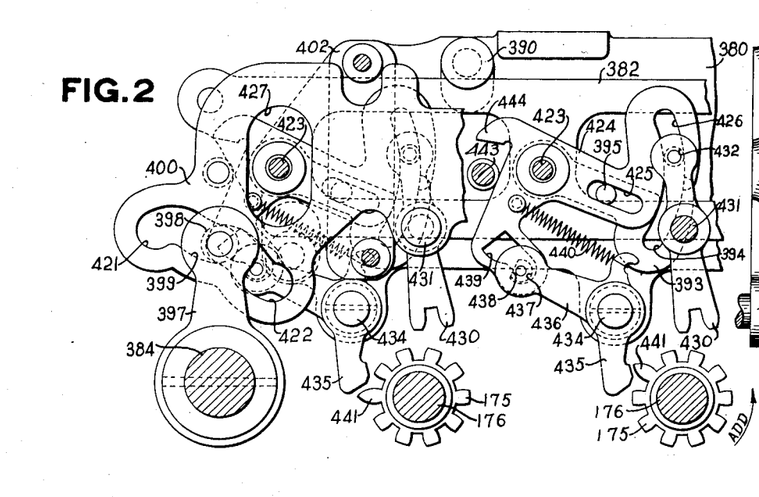
Fig. 2 is a fragmentary view of the transfer mechanism.
Figure 3:
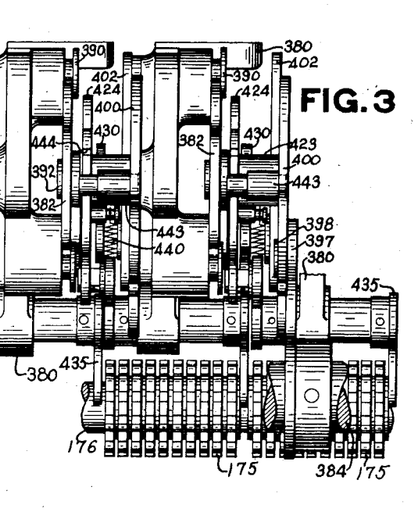
Fig. 3 is a left end elevation of the mechanism of Fig. 2.
Figure 4:
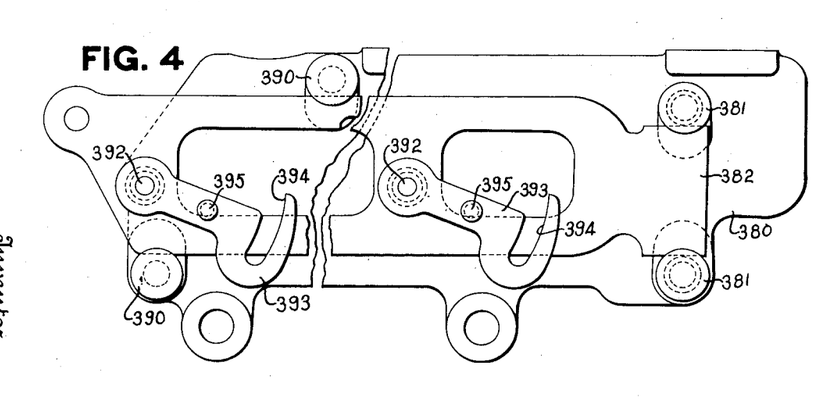
Fig. 4 is a fragmentary view of a part of the transfer operating mechanism.

The transfer mechanism for the different denominational elements are separated from each other and partially supported by small frames 380 (Figs. 2, 3 and 4). These frames associated with the transfer mechanisms for the upper tier of totalizers are all secured to the top frame 136, and those associated with the transfer mechanism for the lower tier of totalizers are all secured to the base 130. Slidably mounted between two studs 381 (Fig. 4) is a horizontal slide 382. Pivoted to this slide 382 is a lever 383 (Fig. 13) loose on a shaft 384 supported by the machine frames. The lever 383 is connected by pin and slot connection to a lever 385 loose on a shaft 346. This lever 385 is pivoted to the horizontal slide 382 associated with the lower tier of totalizers. The lever 385 also carries rollers 386 and 387 co-operating with cams 388 and 389 fast on the drive shaft 150. Rotation of the cams 388 and 389 rocks the lever 385 first counter-clockwise and then clockwise. This movement rocks the lever 383 first clockwise and then counter-clockwise. The rocking movements of these two levers moves the slides 382 first to the right and then to the left, which movement operates certain of the transfer elements, as will be hereinafter described.

There is a pair of these cams and a horizontal slide for each of the denominational groups of totalizer wheels excepting the units group. The units being the lowest denomination there never will be any transfer to it. There are, therefore, nine pairs of cams 388, 389 on the shaft 150. These cams are arranged in a spiral on the shaft, that is, they are so arranged that the lever 385 associated with the tens group of totalizers is rocked first, the lever 385 for the hundreds group is rocked second, and so on up to the highest denominational group of totalizers. This arrangement of cams is for the purpose of having successive transfer movements and in order to have time for the tripping of the transfer mechanism from the lower to higher orders.

The slide 382, adjacent the end upon which the lever 383 is pivoted, is held from lateral movement by flanged studs 390 mounted on the frame 380. As shown in Fig. 4 the horizontal slide 382 does not actually bear against the studs 390 as it does against the studs 381. The reason for this is that this end of the slide has a very slight vertical motion due to the rocking of the lever 383, because said lever is pivoted to the slide by means of a round pin and the slide has a round hole instead of an elongated slot.

Pivoted on studs 392 on the horizontal slide 382 are transfer operating arms 393, each having a slot 394 and each carrying a pin 395. The function and operation of these arms will be hereinafter described.

Secured to the shaft 384 (Figs. 1, 2 and 3) and to a shaft 396, supported by the machine frames are arms 397 each having a roller 398 entered into cam slots 399 in a vertical slide 400 which lies adjacent the side of the frame 380 opposite from that on which the horizontal slide 382 is located. The lower vertical slide 400 has cam slots 399 into which project rolls 398 carried by arms 397 fast on the shaft 346 and a shaft 401 supported by the machine frames. Both the upper and the lower vertical slides 400 are held from lateral movement by retaining bars 402 secured to the frames 380. These slides 400 are adapted to be moved first towards each other and then away from each other. They are guided in their vertical movements by studs 403 which project through vertical slots 404 in each of the slides. These slides carry certain of the transfer elements, which will be hereinafter described.

Figures 18, 19, 20, 21:
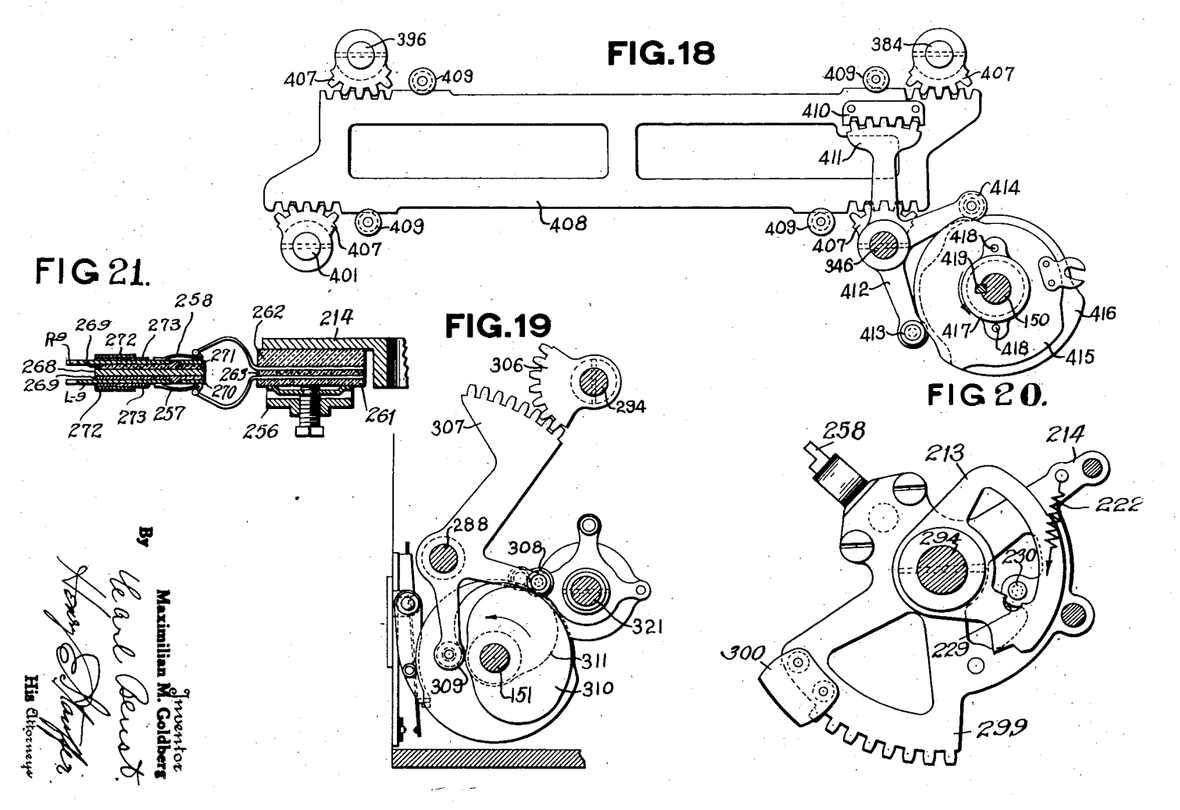
Fig. 18 is a detail view of the mechanism for moving the vertical slides of the transfer mechanism.
Fig. 19 is a sectional view and shows particularly the operating mechanism for the rack differentials.
Fig. 20, shows one of the differentially adjustable members and the means for driving it.
Fig. 21, is an enlarged section taken on line 21—21 of Fig. 1 looking in the direction of the arrows.

The means for moving the vertical slides will now be described. Secured to each of the shafts 384, 396, 346 and 401 (Fig. 1) is a segment 407 (Fig. 18). These segments mesh with rack teeth formed on a bar 408, slidably mounted between rollers 409 mounted on the machine frame. The bar 408 has fast thereto a rack 410 with which meshes a segment 411 integral with a three-armed lever 412 loose on the shaft 346. The lever 412 carries rollers 413 and 414 which cooperate with cams 415 and 416, respectively, loose on the drive shaft 150. Adjacent the cams 415 and 416 is a clutch 417 having pins 418 which engage the cam 415. The clutch 417 is slidably mounted on the shaft 150 but made to rotate therewith by a key 419. By means of this clutch the cams 415 and 416 are given a counter-clockwise rotation (Fig. 18) for each cycle of the machine. The reason for the clutch drive for these two cams is that during the totalizing or record producing operations said cams are rendered ineffective as described in the parent case. The counter-clockwise rotation of these cams rocks the lever 412 first counter-clockwise, then clockwise to normal, then still farther clockwise, and finally counter-clockwise to normal. This movement moves the bar 408 first to the left (Fig. 18), then to the right to normal, then still farther to the right, and finally back to the left to normal position. This movement of the bar 408 rocks the shafts 384 and 396 first clockwise, then counter-clockwise to normal, then still farther counter-clockwise, then finally clockwise to normal. The movement of the bar 408 rocks the shafts 346 and 401 first counter-clockwise, and then clockwise to normal, then still farther clockwise, and finally counter-clockwise to normal. The movement of the shafts 384 and 396, as viewed in Figs. 1 and 2, is first counter-clockwise then clockwise to normal, then still farther clockwise, and finally counter-clockwise to normal. The shafts 346 and 401, as viewed in Fig. 1, move first clockwise, then counter-clockwise to normal, then still farther counter-clockwise, and finally clockwise to normal. The first movement of the shafts 384, 396, 346 and 401 (Figs. 1 and 2) causes the rollers 398 to move into the sections 421 of the slots 399 thereby causing the vertical slides 400 to be moved towards each other. In other words, the upper vertical slide will be moved downwardly and the lower vertical slide will be moved upwardly. The second movement of these shafts brings the rollers 398 to normal positions and moves the vertical slides 400 to normal positions. The third movement of these shafts causes the rollers 398 to move into the sections 422 of the slots 399 thereby causing the vertical slides to be moved away from each other, that is, the upper slide 400 will be moved upwardly and the lower slide 400 will be moved downwardly. The fourth movement of these shafts causes the rollers 398 to assume their normal positions, thereby moving the vertical slides 400 to their normal positions. These two movements of the vertical slides 400 impart motion to certain of the transfer elements which will be hereinafter described.

Pivoted on a stud 423 (Figs. 2 and 3), carried by the frame 380, is a transfer latch lever 424 having a slot 425 which surrounds the pin 395 on the transfer operating arm 393. The transfer latch lever 424 also has a slot 426 of the same radius as the slot 394 in the transfer operating arm 393, the radius for both slots being struck from the center of the studs 392 and 423. These studs coincide in Fig. 2. The stud 423 projects through the vertical slide 400 which has clearance openings 427 for this purpose. These openings are also long enough to take care of the vertical movements of said slide. A transfer lever 430 is pivotally mounted upon a stud 431 carried by the vertical slide 400. This lever 430 has a pin 432 which normally projects in the slot 426 of the transfer latch lever 424.

Figure 5:
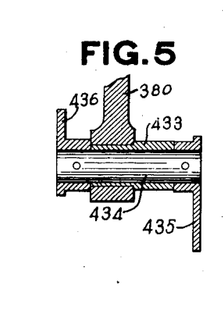
Fig. 5 is a sectional view showing the construction and mounting of the transfer trip pawl.

Supported by a hub 433 (Fig. 5) in the frame 380 is a shaft 434 having pinned thereto a trip pawl 435. This pawl is in the same plane as the totalizer pinion 175 which has been selected for operation. Fast to the other end of the shaft 434 is a retaining arm 436 carrying a flattened pin 437 normally held in engagement with a shoulder 438 of an opening 439 in the transfer latch lever 424 by a spring 440 stretched between a hook on the retaining arm 436 and a stud on the transfer latch lever 424. The transfer lever 430 is in the same plane as the totalizer pinion 175 of next higher denomination than the pinion 175 which is in the plane with the trip pawl 435.

The various steps of movement of the transfer elements are illustrated in Figs. 6 to 11 inclusive. These various movements will now be described. Let it be assumed that the totalizer pinion 175, shown in front in Figs. 6 and 7, and shown in front and also broken away in Figs. 8 to 11, is the units pinion. Let it also be assumed that the pinion 175, shown in back in Figs. 6 to 11, is the tens totalizer pinion. From the location of these parts, as previously described, it will be clear that the trip pawls 435 are in the same plane as the units totalizer pinions 175 and that the transfer levers 430 are in the plane of the tens totalizer pinions 175.

The direction of rotation of the totalizer pinions when adding is counter-clockwise, as viewed in all of these figures. Each pinion has one long tooth 441, and when the units pinion 175 passes from 9 to 0 this long tooth 441 engages the trip pawl 435 (Fig. 6) and rocks said pawl and the retaining arm 436 clockwise, which disengages the pin 437 from the shoulder 438, whereupon said pin 437 strikes the upper edge of an opening 439 in the transfer latch lever 424 and rocks said lever counter-clockwise. Spring 440 also assists in rocking the lever 424 counter-clockwise until the end 442 of the opening 439 contacts the pin 437. The counter-clockwise movement of the transfer latch lever 424 through the engagement of its slot 425 with the pin 395 on the transfer operating arm 393 rocks the arm 393 counter-clockwise until its slot 394 engages the pin 432 on the transfer lever 430. This movement of the transfer latch lever 424 also disengages its slot 426 from the pin 432. When this tripping occurs, as just described, the parts are moved from the positions shown in Fig. 6 and assume the positions as shown in Fig. 7.

Figures 6, 7, 8:
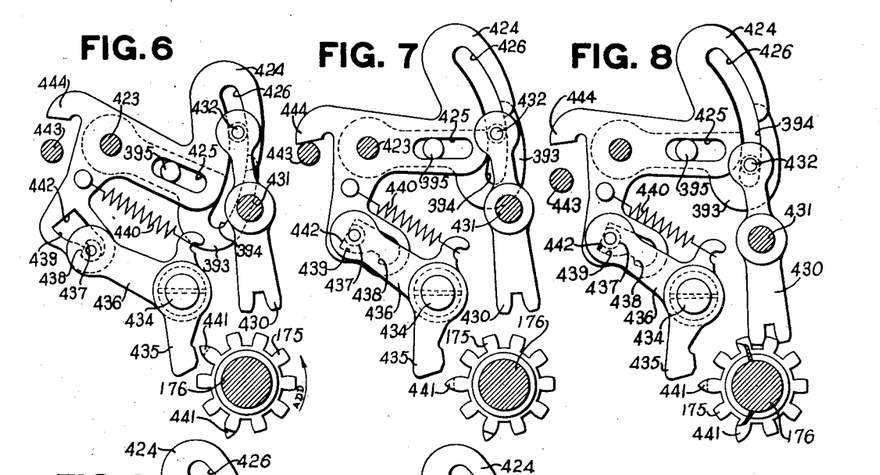
Figs. 6 to 11 inclusive are detail views showing the successive steps of the transfer mechanism for a transfer operation.
Figures 9, 10, 11, 12:
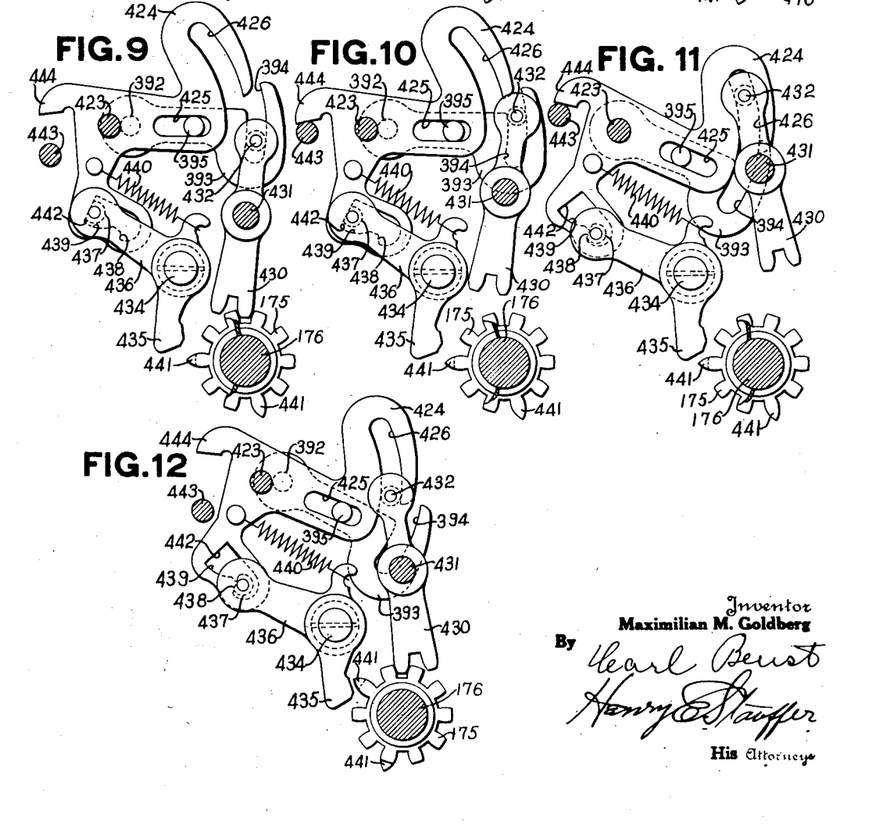
Fig. 12 is a detail view showing the position assumed by the transfer mechanism when there is no transferring to be done.

After the parts have been moved to the positions shown in Fig. 7 the vertical slide 400 (Fig. 2) is moved downwardly and as this slide carries the stud 431 the transfer lever 430 is moved downwardly into engagement with the tens totalizer pinion 175. This moves the pin 432 toward the bottom of the slot 394 in the transfer operating arm 393. The parts are now in the positions shown in Fig. 8. After the parts have been moved to these positions the horizontal slide 382 (Fig. 4) is moved to the right, and as said slide 382 carries the transfer operating arm 393 it moves said arm to the right and the pin 395 assumes the position near the right hand end of the slot 425. The movement of the transfer operating arm 393 to the right also, through its engagement with the pin 432, rocks the transfer lever 430 clockwise. The parts are now in the positions shown in Fig. 9 and it can be seen that the tens pinion 175 has been advanced one tooth farther than that shown in Fig. 8. After the parts have been moved to the positions shown in Fig. 9 the vertical slide 400 is moved to its normal position when the rollers 398 are moved from the sections 421 of the cam slots 399 to the positions shown in Fig. 2. When the vertical slide 400 is moved upwardly as just described it disengages the transfer lever 430 from the tens pinion 175 and moves the pin 432 on said lever to a position near the upper part of the slot 394. The parts are now in the positions shown in Fig. 10. After being moved to these positions the horizontal slide 382 is moved to the left to normal position in the manner previously described, thereby moving the transfer operating arm 393 from the position shown in Fig. 10 to the position shown in Fig. 7. This movement of the transfer operating arm 393 rocks the transfer lever 430 counter-clockwise and the parts are again in the positions shown in Fig. 7. After reaching these positions the vertical slide 400 is moved upwardly (Fig. 2) when the arms 397 are moved clockwise so that the rollers 398 enter the sections 422 of the cam slots 399. The vertical slide 400 carries a stud 443 (Figs. 2 and 3) which co-operates with a tail 444 of the transfer latch lever 424. As the vertical slide 400 moves upwardly from its normal position the stud 443 by its engagement with the tail 444, rocks the transfer latch lever 424 clockwise, which, through its engagement with the pin 395, rocks the transfer operating arm 393 clockwise. The clockwise movement of the transfer latch lever 424 also causes the edge of its opening 439 to act on the pin 437, to rock the retaining arm 436, shaft 434, and trip pawl 435 counter-clockwise until the shoulder 438 again engages the pin 437. The spring 440 then holds the lever 424, arm 393, pawl 435 and arm 436 in this position. The clockwise movement of the transfer latch lever 424 and the simultaneous raising of the stud 431, which it will be remembered is carried by the vertical slide 400, causes the pin 432 to be moved into the upper part of the slot 426 and at the same time slightly rocks the transfer lever 430 in counter-clockwise direction. This movement, however, does not affect any of the totalizer pinions because said lever 430 is out of engagement therefrom. The parts are now in the positions shown in Fig. 11. After the parts have been moved to these positions the rollers 398 (Fig. 2) are moved to normal positions in the slots 399 thus moving the vertical slide 400 to its normal position. When this occurs the studs 443 and 431 are moved downwardly from the positions shown in Fig. 11 to their normal positions shown in Fig. 6. As the stud 431 is moved downwardly it causes a slight clockwise movement of the transfer lever 430 in order to place its tooth in perfect alignment with the tooth space on the totalizer pinion 175 directly therebeneath.

These counter-clockwise, and clockwise, movements of the transfer levers 430 above referred to have no particular significance, they being the result of the relationship between the travel of the studs 432, in the curved notches 426 of the transfer latch levers 424, and the studs 431, which move upwardly in straight lines. The movements are idle, since at the time the transfer levers 430 receive these slight movements, they are disengaged from the totalizer pinions 175.

When a totalizer pinion 175 does not pass from 9 to 0 or, in other words, when there is no transfer, the trip pawl 435 remains in the position shown in Fig. 6. Consequently the transfer latch lever 424 remains in this position. Now when the vertical slide 400 is moved downwardly the transfer lever 430 is moved into engagement with the tens pinion 175 after which the horizontal slide 382 is moved to the right (Fig. 4). As the transfer latch lever 424 was not moved the transfer operating arm 393 was not rocked, as before described, and consequently, during the movement of the horizontal slide 382 to the right, the pin 395 in its movement toward the right end of the slot 425 causes the transfer operating arm 393 to be rocked slightly in clockwise direction. The downward movement of the transfer lever 430 caused its pin 432 to be moved downwardly in the slot 426, but as the transfer operating arm 393 was not raised, said pin 432 did not engage the slot 394, as was the case during transfer movement. Therefore, when the transfer operating arm 393 is moved to the right it does not rock the transfer lever 430. Consequently the tens pinion 175 is not advanced one step as before. The parts are now in the positions shown in Fig. 12. The vertical slide 400 is now raised and the pin 432 moved upwardly to a position near the center of the slot 426 after which the horizontal slide moves the transfer operating arm 393 to the left to its normal position and the parts assume the positions shown in Fig. 6. The vertical slide 400 is then moved upwardly to restore the transfer latch lever 424, had it been tripped, but as it was not tripped, the stud 443 just comes into contact with the tail 444 but does not move the lever 424, and the parts assume the positions shown in Fig. 11, after which the vertical slide 400 is lowered to its normal position and the parts again assume the normal positions shown in Fig. 6.

The vertical aligners 338 (Fig. 1) have slots (not shown) therein. These slots are in the plane of the totalizer pinions 175 which are being actuated by the racks 277. The aligners 338, therefore, as previously stated, only align the totalizer pinions of the various groups which are not being actuated. When the transfer lever 430 is lowered into engagement with the totalizer pinion 175, it acts as an aligner for that pinion.

As there is no transfer to the units totalizer pinion 175, it being the lowest order element, provision must be made for aligning said units totalizer pinion after the actuating racks have been disengaged therefrom and before the horizontal aligners are engaged therewith. This is accomplished by the transfer lever 430 associated with the units pinion 175. However, as no transfer is ever necessary on this wheel, instead of having a pin 432 it has a stud (not shown but similar to the pin 432) by which it is held rigid with the vertical slide 400 associated with the units totalizer elements. Therefore, when this vertical slide is lowered it engages this rigid lever 430 with the units totalizer pinion to hold it in alignment. It is to be understood that the transfer mechanism above described is identical for all of the five upper shafts of totalizers (Fig. 1) and also identical in construction for all of the lower shafts of totalizers, the only difference between the upper and lower transfer mechanisms being that the lower ones are reversed, that is, they are upside down.

There are ten vertical slides 400 associated with the upper groups of totalizers and ten associated with the lower. There are nine horizontal slides 382 associated with the upper groups of totalizers and nine associated with the lower. Each vertical slide 400 of the upper totalizers, except the one associated with the units elements, carries transfer levers 430 and restoring studs 443 for its respective denominational elements of the whole five upper shafts. Likewise, each vertical slide 400 associated with the lower totalizers, except the units slide, carries transfer levers 430 and restoring studs 443 for its respective denominational elements for all five lower shafts. Each of the upper horizontal slides 382 carries five transfer operating arms 393 and each of the lower horizontal slides 382 carries five transfer operating arms 393. From the above description it can be clearly seen that if a totalizer on each of the upper shafts is being actuated at one time and if they all pass from 9 to 0 at the same time, the transferring for the whole five totalizers will be simultaneously effected by the action of the horizontal slide and the vertical slide.

A transfer on a transfer, that is, when a transfer is entered, for example, in the tens totalizer element, of any given totalizer, from the units element and the tens units are standing at "9" before the transfer is entered therein, is effected in the following manner: When the tens totalizer pinion 175 has "1" transferred therein by the transfer lever 430 associated with the units pinion 175, and the tens pinion 175, passes from 9 to 0 it trips the tens trip pawl 435 associated with the tens pinion 175, and the transfer latch lever 424 associated with the hundreds totalizer pinion 175 will be moved to the position shown in Fig. 8. Then, as the horizontal slide 382 is moved, the transfer operating arm 393 associated with the hundreds totalizer pinion 175 rocks the transfer lever 430, associated with the hundreds pinion, from the position shown in Fig. 8 to the position shown in Fig. 9 thereby adding "1" upon the totalizer pinion of the hundreds denomination.

None of the electrical controls nor the circuits have been shown or described in this divisional case because they are not a part of the transfer mechanism and form no part of the invention claimed.

No general operation has been given because the movements of the transfer mechanism have been described in detail along with the description of the parts.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of totalizer elements, a differential actuator therefor, a transfer segment normally held in the inoperative position, means for moving the segment to the operative position, means for holding the segment against oscillation, means controlled by a totalizer element of lower order for disengaging said holding means, and a member adapted to be moved in one direction to engage said segment and in another direction to oscillate the said segment.

2. In a machine of the class described, the combination of totalizer elements, a differential actuator therefor, a transfer segment normally held in the inoperative position, means for moving the segment to the operative position, means for holding the segment against oscillation, means controlled by a totalizer element of lower order for disengaging said holding means, a member adapted to be moved in one direction to engage said segment and in another direction to oscillate the said segment, means intermediate the holding means and the member for moving said member into engagement with the segment upon disengagement of said holding means, and means for moving said member to oscillate said segment.

3. In a machine of the class described, the combination of totalizer elements, a differential actuator, a transfer segment normally held in the inoperative position, means for moving the segment to the operative position, means engaging said segment to prevent oscillation thereof, means controlled by a totalizer element of lower order for disengaging said holding means, a member adapted to be moved into engagement with said segment upon disengagement of said holding means, and means for moving said member to oscillate the segment.

4. In a machine of the class described, the combination of totalizer elements, a differential actuator therefor, a transfer segment normally held in the inoperative position, means for holding the segment against oscillation, means controlled by a totalizer element of lower order for disengaging said holding means, a member adapted to be oscillated to engage said segment and to be reciprocated to oscillate said segment, a pin carried by said member and engaging said holding means whereby said member is oscillated when said holding means is disengaged from the transfer segment, and means for reciprocating said member after its oscillation to oscillate the transfer segment.

5. In a machine of the class described, the combination of an upper set of totalizer elements and a lower set of totalizer elements, a common differential actuator therefor, a transfer segment associated with each set of elements and normally held in their inoperative positions, common means for moving the transfer segments of both sets into the operative positions, means associated with each segment for holding it against oscillation, means controlled by the totalizer elements of lower order of each set for disengaging said holding means, members associated with both the upper and lower sets of totalizer elements and adapted to be moved into engagement with said segments upon disengagement of said holding means, and common means for simultaneously moving said members to oscillate said segments.

6. In a machine of the class described, the combination of an upper set of totalizer elements and a lower set of totalizer elements, a common differential actuator therefor, a transfer segment associated with each set of elements and normally held in their inoperative positions, means associated with each segment for moving the upper segment downwardly and the lower segment upwardly into operative positions, common operating mechanism for said moving means, means associated with each segment to prevent oscillation thereof, means controlled by a totalizer element of lower order of each set for disengaging said holding means, members associated with both the upper and lower sets of totalizer elements and adapted to be moved into engagement with their respective segments upon disengagement of said holding means, means associated with each member for moving it to oscillate its respective segment, and common operating mechanism for the last mentioned moving means.

7. In a machine of the class described, the combination of a totalizer element, a differential actuator therefor, a transfer segment normally held in the inoperative position, means for moving said segment to the operative position, means for holding said segment against oscillation, means adapted to oscillate said segment but normally disengaged therefrom, means controlled by a totalizer element of lower order for disengaging said holding means from the transfer segment and simultaneously engaging said oscillating means with said transfer segment, and means for actuating said oscillating means.

8. In a machine of the class described, the combination of a plurality of totalizer elements, a common differential actuator therefor, transfer segments mounted on a common support and held in their inoperative positions, means for moving the support to move said segments into their operative positions, holding means for said segments independently mounted; independent means controlled by the totalizer elements of lower order for disengaging said holding means, a plurality of members, one for each totalizer element mounted on a common support and adapted to be moved into engagement with said segments upon disengagement of said holding means, means for moving said members into engagement with the segments, and means for moving said support to cause said members to oscillate the transfer segments.

9. In a machine of the class described, the combination of a plurality of sets of totalizer elements, a common differential actuator therefor, a plurality of transfer segments, one for each set of totalizer elements, mounted on a common support and normally held in their inoperative positions, means for moving the support to move the segments into their operative positions, independently mounted means for holding each segment against oscillation, a plurality of members, one for each segment, mounted for independent oscillation on a common support, independent means controlled by the totalizer elements of lower order for disengaging the holding means and simultaneously oscillating said members to engage them with the transfer segments, and means for moving the common support for said members so that all members are moved to oscillate the transfer segments.

10. In a machine of the class described, the combination of a plurality of totalizer elements of the same denomination, an actuator therefor, a plurality of transfer members mounted on a common support, means for moving said common support to engage the transfer members with the totalizer elements, and means for moving the transfer members to operate the totalizer elements.

11. In a machine of the class described, the combination of a plurality of totalizer elements of the same denomination, an actuator therefor, a plurality of transfer members mounted on a common support, means for moving said common support to engage the transfer members with the totalizer elements, and a single member having thereon arms for moving the transfer members to operate the totalizer elements.

12. In a machine of the class described, the combination of a plurality of totalizer elements arranged in groups, an actuator therefor, a transfer segment for each totalizer element in the various groups, common means supporting all segments cooperating with each group, and means common to all of said supporting means for operating the common supporting means to engage the transfer segments with the totalizer elements.

13. In a machine of the class described, the combination of a plurality of totalizer elements arranged in groups, an actuator therefor, a transfer segment for each totalizer element in the various groups, common means supporting all segments cooperating with each group, means common to all of said supporting means for operating the supporting means to engage the transfer segments with the totalizer elements, and means for moving the transfer segments associated with all groups of totalizer elements to operate said totalizer elements.

14. In a machine of the class described, the combination of a plurality of totalizer elements arranged in two groups, an actuator therefor, a transfer segment for each totalizer element, common means for supporting all transfer segments of one group, common means for supporting all transfer segments of the other group, and a device common to both of said supporting means for moving said transfer segments into engagement with the totalizer elements.

15. In a machine of the class described, the combination of a plurality of totalizer elements arranged in two groups, an actuator therefor, a transfer segment for each totalizer, common means for supporting all transfer segments of one group, common means for supporting all transfer segments of the other group, a device common to both of said supporting means for moving said transfer segment into engagement with the totalizer elements, and means for moving the transfer segments associated with all groups of totalizer elements to operate said totalizer elements.

16. In a machine of the class described, the combination of a plurality of totalizer elements, differential actuators therefor, a transfer segment associated with each element and normally held in their inoperative positions, means for moving the transfer segments into operative positions, means associated with each segment for holding it against oscillation, means controlled by the totalizer elements of lower order for disengaging said holding means for the next higher order elements, a member associated with each element and adapted to be moved into engagement with said segments upon disengagement of said holding means, and means for simultaneously moving said members to oscillate said segments.

In testimony whereof I affix my signature.

MAXIMILIAN M. GOLDBERG.